United States Patent Office 2,931,826
Patented Apr. 5, 1960

2,931,826

PROCESS FOR THE MANUFACTURE OF DIALKYL DICHLOROVINYL PHOSPHATES

Ernst Beriger, Allschwil, Switzerland, assignor to Ciba Limited, Basel, Switzerland, a firm No Drawing. Application January 9, 1959
Serial No. 785,804

Claims priority, application Switzerland
February 12, 1958

6 Claims. (Cl. 260—461)

It is known that dialkyl dichlorovinyl phosphates can be made by reacting a trialkyl phosphite with chloral. These condensation products, especially dimethyl dichlorovinyl phosphate, are very good insecticides. Certain difficulties are connected with the preparation of the trialkylphosphites used as starting materials, since they must be worked up in the presence of tertiary bases. The production of trimethyl phosphite, in particular, is not very simple, because difficulties arise in separating and isolating the trimethyl phosphite from the reaction mixture.

The present invention is based on the observation that dialkyl dichlorovinyl phosphates can be made by using, instead of trialkyl phosphites, addition products thereof with halides of monovalent copper. These addition products can be made in a simple manner by reacting phosphorus trichloride with the calculated quantity of an alcohol in the presence of a cuprous halide and an inert organic solvent.

Accordingly, the present invention provides a process for the manufacture of dialkyldichlorovinyl phosphates, wherein chloral is reacted with an addition compound of a trialkyl phosphite with a halide of monovalent copper. As the cuprous halide there is used more especially cuprous chloride. The alkyl groups of the trialkyl phosphites are preferably of low molecular weight, for example, propyl, ethyl and especially methyl groups. The alkyl groups may be substituted by halogen atoms or alkoxy groups. The reaction is advantageously carried out in an inert solvent, such as benzene or chlorobenzene, and at a raised temperature. It is of great advantage to use for the reaction the reaction mixture resulting from the production of the addition compound of the cuprous halide with the trialkyl phosphite.

The following examples illustrate the invention, the parts being by weight unless otherwise stated, and the relationship of parts by weight to parts by volume being the same as that of the kilogram to the liter:

*Example 1*

99 parts of pulverized cuprous chloride are mixed with 96 parts of methyl alcohol and 500 parts by volume of toluene. The mixture is cooled to −10° C. and 137.5 parts of phosphorus trichloride are added dropwise in the course of 1½ hours at −10 to 0° C., while stirring well. A white addition compound of 1 molecular proportion of trimethyl phosphite with 1 molecular proportion of cuprous chloride separates out. The mixture is stirred for a further 20 minutes at 0–5° C. and the complex is then filtered off. It is washed with a small amount of petroleum ether and dried in a vacuum desiccator. The yield amounts to 188 parts. The white addition compound decomposes at 192–193° C. It can be recrystallized from chloroform.

22.3 parts of the addition compound of trimethyl phosphite with cuprous chloride are stirred in 30 parts by volume of benzene. The mixture is heated to the boil and 14.8 parts of chloral are added dropwise in the course of ½ hour. The mixture is then stirred for a further 1½ hours at the boiling temperature. At the end of this period 3.7 parts of methyl chloride will have been collected in a cooled recipient. The reaction mixture is allowed to cool, filtered to remove the cuprous chloride, and the filtrate is evaporated at a bath temperature of 40° C. under the reduced pressure of a water jet pump. The residue is distilled under a high vacuum, and yields 17.3 parts of dimethyl-dichlorovinyl phosphate boiling at 71° C. under 0.05 mm. pressure. This represents a yield of about 80% of the theoretical yield.

*Example 2*

19.8 parts of cuprous chloride are well stirred in 100 parts by volume of toluene and 19.2 parts of methyl alcohol. The mixture is then cooled to −10° C., and 27.5 parts of phosphorus trichloride are added dropwise in the course of 2 hours at −10° C. to −5° C. A moderate stream of nitrogen is then passed through the mixture for 2½ hours first in the cold and then at room temperature, in order to expel the greater part of the hydrogen chloride formed during the reaction. The temperature of the mixture is then raised to 80° C., and 29.5 parts of chloral are run in in the course of 15 minutes, while stirring.

In order to complete the reaction, the mixture is maintained for a further hour at 100° C. At the end of this period 7.1 parts of methyl chloride will have been collected in a cooled recipient. The mixture is allowed to cool, and the cuprous chloride (19.3 parts) is filtered off. The filtrate is evaporated in vacuo at 60° C., and the residue is distilled in a high vacuum. There are obtained 27.8 parts of dimethyl dichlorovinyl phosphate, which represents a yield of 63% of the theoretical yield.

$C_4H C_4Cl_2P$: Found—P, 14.10%; Cl, 32.37%. Calculated—P, 14.02%; Cl, 32.09%.

*Example 3*

A mixture of 100 parts of cuprous chloride with 138 parts of absolute ethanol and 500 parts by volume of toluene is cooled to −10° C., while stirring. 136 parts of phosphorus trichloride are added dropwise in the course of 1½ hours at −10 to −5° C., and then the temperature is maintained for a further ¾ hour at 0–5° C. The mixture is then filtered to remove the unreacted cuprous chloride, the filtrate is evaporated under the reduced pressure of a water jet pump and then in a high vacuum at a bath temperature of 40–50° C. The residue (184 parts of a colorless oil) so obtained consists of the addition compound of triethyl phosphite with cuprous chloride.

26.5 parts of the addition compound are suspended in 30 parts by volume of benzene and heated at 80° C., while stirring. 14.8 parts of chloral are added dropwise in the course of 5 minutes, and the temperature is maintained at 80° C. for one hour. At the end of this period 3.4 parts of ethyl chloride will have been collected in a cooled recipient. The cuprous chloride (5.3 parts) is filtered off, and the volatile constituents of the filtrate are evaporated at a bath temperature of 40° C. under the reduced pressure of a water jet pump. The residue is distilled in a high vacuum, and yields 13.7 parts of diethyl dichlorovinyl phosphate boiling at 92–98° C. under 0.15 mm. pressure.

*Example 4*

A mixture of 99 parts of cuprous chloride with 180 parts of n-propyl alcohol and 500 parts by volume of toluene is cooled to −10° C., while stirring well, and 137.5 parts of phosphorus trichloride are added in the course of 2 hours. The temperature is then maintained for a further ½ hour at 0° C., and the unreacted cuprous chloride is filtered off. The filtrate is evaporated first under the reduced pressure of a water jet pump and then in a high vacuum at a bath temperature of 40–50° C. The residue (248 parts of a colorless oil) so obtained consists of the addition compound of tripropyl phosphite with cuprous chloride.

30.7 parts of the addition compound are heated to 90° C. and 19.7 parts of chloral are added dropwise in the course of ½ hour. The propyl chloride formed is distilled off continuously. When the addition is complete the bath temperature is maintained for a further hour at 90° C. The mixture is then cooled and filtered to remove precipitated cuprous chloride (5.5 parts). The filtrate is freed from volatile constituents in vacuo, and the residue is distilled under a high vacuum. There are obtained 11.3 parts of dipropyl dichlorovinyl phosphate boiling at 104–110° C. under 0.08 mm. pressure.

What is claimed is:

1. A process for the manufacture of di(lower)alkyl-dichlorovinyl phosphates, which comprises reacting chloral with the addition compound of a tri(lower)alkyl phosphite with cuprous chloride.

2. A process for the manufacture of di(lower)alkyl-dichlorovinyl phosphates, which comprises reacting chloral with the addition compound of a tri(lower)alkyl phosphite with cuprous chloride in the presence of an inert organic solvent and at an elevated temperature.

3. A process according to claim 2, wherein the reaction mixture resulting from the production of the addition compound of the tri(lower)alkyl phosphite with the cuprous chloride, is used for the reaction.

4. A process for the manufacture of dimethyl-dichlorovinyl phosphate, which comprises reacting chloral with the addition compound of trimethylphosphite with cuprous chloride.

5. A process for the manufacture of dimethyl-dichlorovinylphosphate, which comprises reacting chloral with the addition compound of trimethylphosphite with cuprous chloride, in the presence of an inert organic solvent and at an elevated temperature.

6. A process according to claim 5, wherein the reaction mixture resulting from the production of the addition compound of trimethylphosphite with cuprous chloride is used for the reaction.

No references cited.